S. LAKE.
BUOYANCY REGULATING APPARATUS FOR SUBMARINE BOATS.
APPLICATION FILED APR. 9, 1914.
1,123,762.  Patented Jan. 5, 1915.
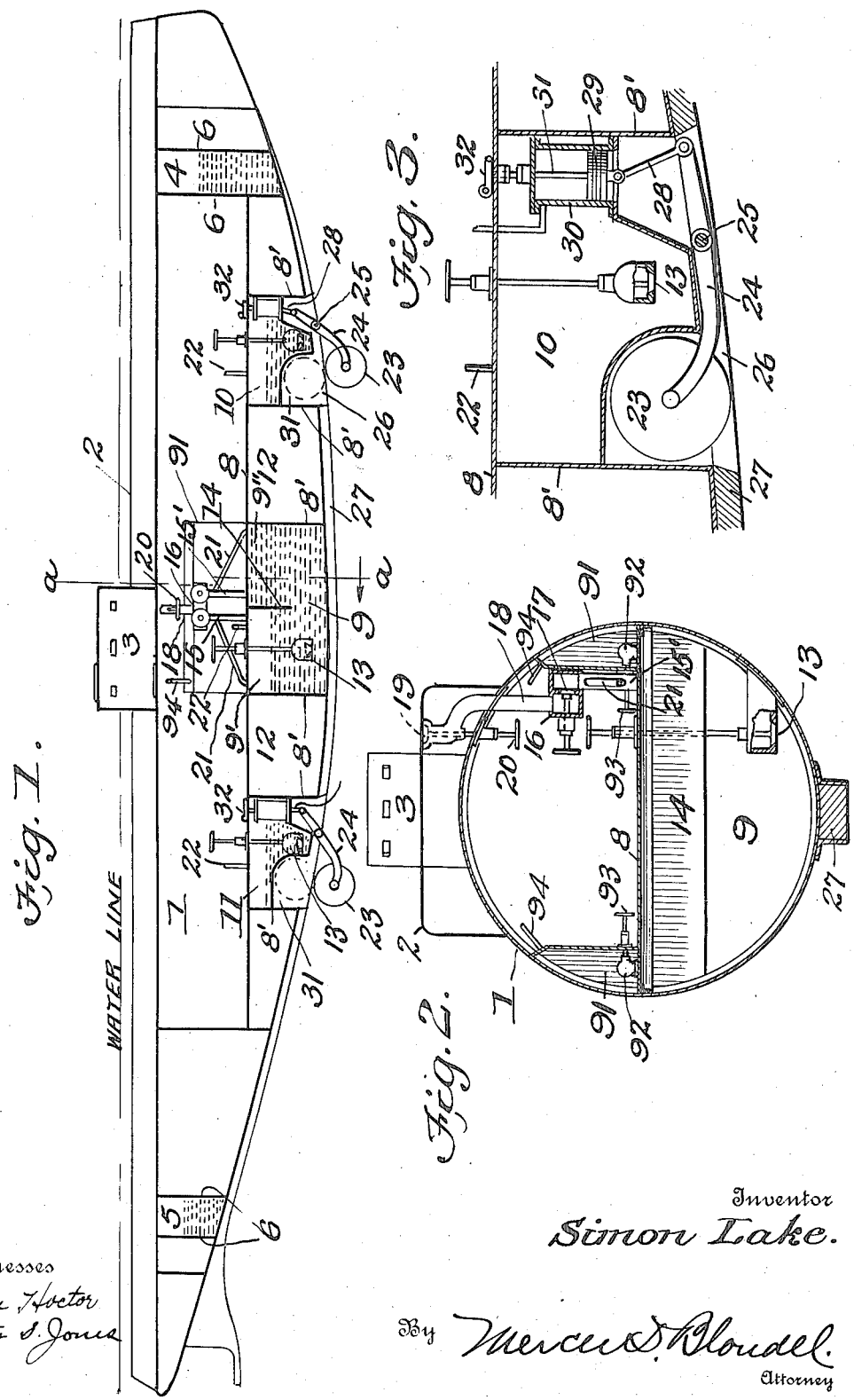
Witnesses
Hattie Hector
Walter S. Jones
Inventor
Simon Lake.
By Mercer D. Blondel.
Attorney

UNITED STATES PATENT OFFICE.

SIMON LAKE, OF MILFORD, CONNECTICUT, ASSIGNOR TO LAKE TORPEDO BOAT COMPANY OF MAINE, OF BRIDGEPORT, CONNECTICUT, A CORPORATION OF MAINE.

BUOYANCY-REGULATING APPARATUS FOR SUBMARINE BOATS.

1,123,762.      Specification of Letters Patent.      Patented Jan. 5, 1915.

Application filed April 9, 1914. Serial No. 830,763.

*To all whom it may concern:*

Be it known that I, SIMON LAKE, a citizen of the United States, residing at Milford, in the county of New Haven and State of Connecticut, have invented certain new and useful Improvements in Buoyancy-Regulating Apparatus for Submarine Boats, of which the following is a specification.

As is well known, submarine or submersible vessels have their fixed weights so disposed that they trim by the stern when lying at and operating on the surface, and their water-ballast-tanks so disposed that when water is admitted to the tanks to put the boats into submerging condition they are brought to an even keel, a position essential for submerged operations.

In submarine boats heretofore constructed by me the main, or center ballast-tanks have been so disposed that the center of volume thereof have been located forward of the center of gravity and the center of buoyancy of the boats, this construction and arrangement being clearly shown in Letters Patent No. 650,758, granted to me May 29, 1900. In addition to these center tanks, forward and after ballast-tanks (sometimes called forward and aft main-ballast-tanks) are provided, as well as forward and after trimming-tanks of relatively smaller capacity than the main-ballast-tanks, the said trimming-tanks being arranged as far forward and aft as is practicable, whereby through the transference of the water from one tank to the other, to trim the boat an appreciable movement is obtained. In submerging this class of boats, the main or center ballast-tank is always completely filled, and only sufficient quantities of water are let into the forward and after ballast- and trimming-tanks to further reduce the buoyancy to within three or four hundred pounds of its surface buoyancy, under which reserve of buoyancy they are operated submerged, it being understood that in submerged navigation the boats are forced under the water by the horizontal rudders and hydroplanes as the boats are propelled through the water. In addition to the ballast- and trimming-tank, there is provided what is commonly called auxiliary or final adjusting-tanks which are arranged as nearly in vertical alinement with the centers of gravity and buoyancy as is possible, so as not to effect the trim of the boats when water-ballast is admitted to them, and into these tanks additional quantities of water are admitted to effect the desired amount of reverse of buoyancy under which the boats are to operate. These final adjusting or auxiliary tanks are expensive to install, and take up much valuable room, and, of course, require separate sea connection, as well as separate air lines and valves for supplying compressed-air to control the admission and expulsion of the water, and separate vent pipes and valves.

The object of the invention is to provide, in this class of vessels, a simple and efficient improvement in the construction of center or main-ballast-tanks, and apparatus for controlling the contents of the tanks, whereby, without the employment of the final adjusting tanks, the buoyancy of the boats may be quickly destroyed and as quickly restored, to cause them to rise to the surface, as when taking observations, and to as rapidly submerge, and without affecting the trim of the boats.

The invention consists in providing a transverse partition or apron in the upper end of the central or main-ballast-tank, which is preferably arranged at the longitudinal center of the tank, and in extending vent pipes from the tank from each side of the partition, the said pipes being connected to a manifold, from which extends a single vent pipe which opens through the skin, or through the deck of the boat, and having valves for controlling the passages through said pipes. These and other features germane thereto, constitute the invention, as will be hereinafter fully described and then pointed out in the claims.

In the drawings illustrating the invention, in the several figures of which like parts are similarly designated, Figure 1 is a diagrammatic vertical longitudinal section of a submarine torpedo boat provided with my improvements. Fig. 2 is a diagrammatic transverse section drawn on a larger scale on the line *a—a* of Fig. 1. Fig. 3 is a detail section drawn through the forward ballast-tank illustrating the connection of the forward cushion-wheel with its operating piston.

1 designates the hull of a submarine or submersible torpedo boat having a superstructure 2 and conning tower 3 extending from the top thereof, and having in its bow and stern the usual trimming-tanks 4 and 5, formed by transverse partitions or bulk-heads 6. Within the central section of the main hull, is arranged a horizontal partition 8 and the space thus formed below the partition and the hull proper, is divided by transverse partitions 8' into a central main-ballast-compartment or tank 9, forward and after ballast-tanks 10 and 11, respectively, and forward and after compartments 12 which are utilized for the location of compressed air bottles and as battery compartments, the said compartments 12 being arranged between the ballast-tanks as shown. The ballast tanks 9, 10 and 11 are open to the surrounding body of water through an opening in the hull plating, said openings being controlled by hand operated valves 13 in the usual manner. If desired, the main-ballast-tank 9 may be provided with branches or auxiliary tanks 91, extending upwardly into the hull at the sides of the boat, to increase the ballast space for the purpose hereinafter explained.

The center of volume of the main-ballast-tank is arranged forward of the centers of gravity and buoyancy of the boat, and is divided by a transverse partition or apron 14 which extends downwardly from the horizontal partition 8 or top of the tank providing two compartments or chambers 9' and 9'' in the top of said tank, the partition being connected air and water-tight to the said partition 8 and to the skin of the hull. Extending from the tank 9, adjacent to the partition 14, are vent pipes 15 and 15' connected to a manifold 16 having hand operative valves 17 for controlling the passages through said pipes, and from the manifold extends a single vent pipe 18 which extends upwardly through the hull and opens through the deck of the boat. The pipe 18 is provided at its upper end with a valve seat for a valve 19 controlling the passage through the pipe, the stem of the valve being extended into the main hull and provided with a hand wheel 20.

Extending from the vent pipes 15 and 15' to the forward and rear ends, respectively, of the compartments 9' and 9'' of the main-ballast-tank 9, are vent pipes 21 of smaller diameter than the main vents 15 and 15', and these pipes serve to vent the said compartments in the event of the boat being out of horizontal trim, so that the tank may be completely filled when the sea valve 13 is open.

22, designates compressed-air-pipes leading from compressed-air-bottles (not shown), for supplying air to the tanks to expel the water. Suitable pumps for pumping the water from the tank are also employed, but as these are of common construction and form no part of the present invention it is not thought necessary to further describe or to show them.

The boat is of the type designed to travel immediately adjacent to or upon the water-bed, as shown and described in Letters Patent No. 726,705, granted to me April 20, 1903; that is to say, it is provided with bearing-rollers or wheels 23, carried at the outer ends of arms 24 pivotally held intermediate their ends on pins 25 located in recesses 26 formed in the keel 27, in the sides of which the ends of the pins are held. The inner ends of the arms are connected by links 28 pivoted to the lower sides of pistons 29 operating in hydraulic cylinders 30 mounted in the ballast-tanks 10 and 11 and opening at their lower ends to the surrounding body of water.

31 designates piston rods extending upwardly through the head of the cylinders and through the partition 8 into the interior of the boat.

When elevated, the wheels are housed in wells formed in the tanks 10 and 11 and are locked in elevated position by plates 32 hinged to the partition 8 and adapted to fold across the tops of the rods, as shown in Fig. 3. The wheels are adjusted into and out of operative position by admitting water to and pumping it from the upper ends of the cylinders, as clearly described in my said Patent No. 726,705, and further description in the present case is thought unnecessary.

In operation, we will assume that the boat is operating on the bottom of and in comparatively shallow water, with negative buoyancy and with the cushioning rollers or wheels lowered so that they will contact with the water-bed. Should it be desired to quickly come to the surface to take observation, enough compressed-air is admitted to the after end or compartment 9' of the tank 9 to blow the water therefrom through the sea valve 13 to thus restore the buoyancy of the boat and cause it to rise to the surface, so that the upper end of the conning tower will be projected above the surface. Then when the desired observations have been made, the valves controlling the passages through the vent pipes 15 and 18 are opened to permit water from the surrounding body of water to flow into the tank to thus destroy the buoyancy of and cause the boat to sink. The valve 17 controlling the passage through the vent 15 and the valve 19 controlling the passage through the pipe 18 are then closed so that the tank is made ready to be blown when it is desired to again come to the surface.

As shown in Fig. 2, the horizontal partition 8 extends entirely across the boat and has its longitudinal edges connected air and water-tight to the skin of the hull, and that the branches or auxiliary compartments 91 are built upon the top of the partition and communicate with the tank 9 through valve controlled pipes 92, the stems of the valves being extended through the vertical walls of the branches 91 into the working compartment of the boat and provided with hand wheels 93. In ordinary conditions water is excluded from these branch compartments when the tank 9 is filled; however, in the event of the boat being given excess buoyancy, due to the consumption of stores, fuel and through the discharge of its torpedoes, and when operating in waters of different density when the main-tank 9 would not be of sufficient capacity to sink the boat, water may then be let into the branches or auxiliary compartments 91 to bring about the desired trim. Water may be drained from the branches 91 through the valves 92, or blown through the valves by compressed air which is led into the tops of the tanks through pipes 94 extending from a suitable supply source (not shown).

As shown most clearly in Fig. 1, the center of volume of the after compartment 9' of the tank 9 is arranged in substantially vertical alinement with the center of buoyancy and center of gravity of the boat, so that, when water is blown from the said compartment to restore the buoyancy of the boat, its trim will not be affected. In practice, the partition or apron 14 will be made deep enough so that when about one half of the quantity of water in the compartment above the lower end of the partition is blown from the tank, the normal reserve of buoyancy will be restored, so that the boat will automatically rise to the surface when at rest, in other words, the amount of water expelled will give to the boat a considerable reserve of buoyancy.

What I claim is:

1. A buoyancy regulating apparatus for submarine or submersible boats, comprising, in combination with the main-ballast-tank thereof, of a compartment arranged in said tank in open communication therewith and having its center of contents arranged in substantially vertical alinement with the center of gravity and center of buoyancy of the boat, and means for controlling the contents of said compartment, whereby to cause the boat to rise or sink on an even-keel.

2. A submarine or submersible boat, having a central main-ballast-tank the center of volume of which is located forward of the center of gravity and center of buoyancy of the boat, a partition or apron arranged in the upper end of said tank providing compartments or chambers in said upper end, the after one of which having its center of volume in substantially vertical alinement with the centers of gravity and buoyancy of the boat when the boat is on an even-keel, and means for controlling the admission of water-ballast to the compartment, and means to expel water therefrom to control the buoyancy of the boat as specified.

3. A submarine or submersible torpedo boat, having a main-ballast-tank whose center of volume is located forward of the centers of gravity and buoyancy of the boat, and having a compartment therein whose center of volume is arranged in substantially vertical alinement with the centers of gravity and buoyancy of the boat when the boat is on an even-keel, means for admitting water to said tank and to said compartment, a vent leading from said compartment, and means for conducting air under pressure to said compartment for expelling water therefrom to cause the boat to rise on an even-keel.

4. A submarine or submersible boat, having the upper end of its central main-ballast-tank provided with compartments, the center of volume of one of said compartments being arranged in substantially vertical alinement with the center of gravity and center of buoyancy of the boat, means for expelling water from said compartment, vent pipes extending from each compartment, and means for admitting water to said tank and to said compartments thereof.

5. A submarine or submersible torpedo boat, having a main-ballast-tank the center of volume of which is arranged forward of the center of gravity and center of buoyancy of the boat, said tank having a compartment whose center of volume is arranged in substantially vertical alinement with the centers of gravity and buoyancy of the boat when the boat is on an even-keel, whereby when water is expelled from or admitted to said compartment, the boat will be caused to rise or sink on an even-keel.

6. In a submarine or submersible boat, a central water-ballast-tank having a compartment therein in open communication therewith, the center of volume of which is arranged in vertical alinement with the centers of gravity and buoyancy of the boat when the boat is on an even-keel, means for admitting water-ballast to said tank and to said compartment, and means for supplying air under pressure to said compartment to control the buoyancy of the boat.

7. A submarine or submersible boat, having a central main-ballast-tank the center of volume of which is arranged forward of the centers of gravity and buoyancy of the boat, a transverse partition arranged in the upper end of said tank providing forward and after compartments in open communication at their lower ends with the tank, said after compartment having its center of volume in substantially vertical alinement with the centers of gravity and buoyancy of the boat when the boat is on an even-keel, valve-controlled vents opening into the top of each compartment, and means for conducting air under pressure to said after compartment to expel water therefrom, for the purpose specified.

8. A submarine or submersible boat, having a main-ballast-tank the center of volume of which is located forward of the centers of gravity and buoyancy of the boat, means for controlling the admission of water ballast to said tank, a transverse partition arranged in the upper end of the tank and connected to the top and sides thereof air- and water-tight, providing forward and after compartments in the upper end of the tank, valve-controlled vent pipes leading into the top of each compartment from each end thereof, and means for conducting air under pressure to said after compartment for controlling the contents of said compartment, for the purpose specified.

9. A submarine or submersible boat, having a central main-ballast-tank, forward and after ballast-tanks, and forward and after trimming-tanks, compartments arranged in said main-ballast-tank in open communication therewith at their lower ends, one of said compartments having its center of volume arranged in substantially vertical alinement with the centers of gravity and buoyancy of the boat when the boat is on an even-keel, means for admitting water-ballast to said tanks, and means for excluding water from one of said compartments in the main-ballast-tank whereby to cause the boat to rise and sink on an even-keel.

10. A submarine or submersible boat, having a central main-ballast-tank, forward and after ballast-tanks, and forward and after trimming-tanks, a partition arranged in said main-ballast-tank providing forward and after compartments in the upper end thereof which are in open communication with said tank, vent pipes extending from the said compartments, valves controlling said vent pipes, means for conducting air under pressure to said after compartment for the purpose specified, auxiliary tanks arranged above and at the sides of said main-ballast-tank and communicating therewith, and valves controlling the communications.

In testimony whereof I have hereunto set my hand this day 31st of March, A. D. 1914.

SIMON LAKE.

Witnesses:
JAMES A. PEASE,
HATTIE HOCTOR.